United States Patent
Kennedy et al.

(10) Patent No.: US 6,555,619 B1
(45) Date of Patent: Apr. 29, 2003

(54) PHYSICALLY CROSSLINKED AMPHIPHILIC NETWORKS, METHODS OF PREPARATION, AND USES THEREOF

(75) Inventors: Joseph P. Kennedy, Akron, OH (US); Pious Kurian, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/606,604

(22) Filed: Jun. 29, 2000

(51) Int. Cl.$^7$ .............................................. C08L 83/00
(52) U.S. Cl. ...................... 525/100; 525/101; 525/103; 525/106; 525/404
(58) Field of Search ................................. 525/404, 100, 525/101, 103, 106

(56) References Cited

U.S. PATENT DOCUMENTS

| | | |
|---|---|---|
| 4,085,168 A | 4/1978 | Milkovich et al. |
| 4,486,572 A | 12/1984 | Kennedy |
| 4,942,204 A | 7/1990 | Kennedy |
| 5,073,381 A | 12/1991 | Ivan et al. |
| 5,252,692 A | 10/1993 | Lovy et al. |
| 5,527,170 A | 6/1996 | Graves et al. |
| 5,783,633 A | 7/1998 | Sperling et al. |
| 5,786,425 A | 7/1998 | Sperling et al. |
| 5,786,426 A | 7/1998 | Sperling et al. |
| 5,858,264 A | 1/1999 | Ichino et al. |
| 5,972,375 A | 10/1999 | Truter et al. |
| 6,030,442 A | 2/2000 | Kabra et al. |

FOREIGN PATENT DOCUMENTS

| | | |
|---|---|---|
| GB | 2 276 627 A | 10/1994 |

OTHER PUBLICATIONS

Kurian et al, J. Polym. Sci. 38(17), 2000.*
Lubnin et al. J. Macromol. Sci. A31(12) 1943–53, 1994.*
E. Tziampazis, J. Kohn, and P.V. Moghe. "PEG–variant Biomaterials as Selectively Adhesive Protein Templates: Model Surfaces for Controlled Cell Adhesion and Migration." Biomaterials 2000, vol. 21, p. 511–520.
J.P. Kennedy. "Novel Polyisobutylene–based Biomaterials." Trends Polym. Sci. 1993, vol. 1, No. 12, p. 381–388.
B. Keszler, J.P. Kennedy, N.P. Ziats, M.R. Brunstedt, S. Stack, J.K. Yun, and J.M. Anderson. "Amphiphilic Networks." Polymer Bulletin 1992, vol. 29, p. 681–688.
M.A. Sherman, J.P. Kennedy, D.L. Ely, and D. Smith. "Novel Polyisobutylene/polydimethylsiloxane Bicomponent Networks: III. Tissue Compatibility." J. Biomater. Sci. Polymer Edn. 1999, vol. 10, No. 3, p. 259–269.
B. Gao and J. Kops. "Synthesis of Tri–block Copolymer Based on Polyisobutylene and poly(ethylene glycol)." Polymer Bulletin 1995, vol. 34, p. 279–286.
J.M. Rooney. "Synthesis of Phenol–Terminated Polyisobutylene: Competitive Chain Transfer Reactions." Journal of Applied Polymer Science 1980, vol. 25, p. 1365–1372.
J.M. Rooney. "Synthesis of a Block Copolymer Containing Polyisobutylene and Polyethylene Oxide Segments." Journal of Polymer Science: Polymer Chemistry Edition 1981, vol. 19, p. 2119–2122.
B. Sar and I. Piirma. "Amphipathic Block Copolymers of Polyisobutylene and Polyoxyethylene." Polym. Prepr. 1994, vol. 35, p. 735–736.
Z. Pu, W.J. Van Ooij, and J.E. Mark. "Hydrolysis Kinetics and Stability of bis(triethoxysilyl)ethane in Water–Ethanol Solution by FTIR Spectroscopy." J. Adhesion Sci. Technol. 1997, vol. 11, No. 1, p. 29–47.
J. Puskas, G. Kaszas, J.P. Kennedy, and T. Kelen. "Quasiliving Carbocationic Polymerization. III. Quasiliving Polymerization of Isobutylene." J. Macromol. Sci.–Chem. 1982–83, vol. A18, No. 9, p. 1229–1244.
R.F. Storey, B.J. Chisholm, and L.B. Brister. "Kinetic Study of the Living Cationic Polymerization of Isobutylene Using a Dicumyl Chloride/TiCl4/Pyridine Initiating System." Macromolecules 1995, vol. 28, p. 4055–4061.
K. te Nijenhuis. "Thermoreversible Networks." Adv. Polym. Sci. 1997, vol. 130, p. 1–12.
Y. Liu, M.B. Huglin, T.P. Davis. "Preparation and Characterization of Some Linear Copolymers as Precursors to Thermoplastic Hydrogels." Eur. Polym. J. 1994, vol. 30, No. 4, p. 457–463.
Y. Liu and M.B. Huglin. "Polymer Communications." Polymer 1995, vol. 36, No. 8, p. 1715–1718.
K. Mortensen, W. Brown, and E. Jorgensen. "Phase Behavior of Poly(propylene oxide)–Poly(ethylene oxide)–Poly(propylene oxide) Triblock Copolymer Melt and Aqueous Solutions." Macromolecules 1994, vol. 27, p. 5654–5666.
J. Appell, G. Porte, and M. Rawiso. "Interactions between Nonionic Surfactant Micelles Introduced by a Telechelic Polymer. A Small Angle Neutron Scattering Study." Langmuir 1998, vol. 14, p. 4409–4414.
C. Maechling–Strasser, F. Clouet, and J. Francois. "Hydrophobically End–Capped Polyethylene–oxide Urethanes: 2. Modelling their Association in Water." Polymer 1992, vol. 33, No. 5, p. 1021–1025.

(List continued on next page.)

Primary Examiner—Jeffrey Mullis
(74) Attorney, Agent, or Firm—Renner, Kenner, Greive, Bobak, Taylor & Weber

(57) ABSTRACT

The present invention relates to amphiphilic copolymer networks comprising polyisobutylene segments and poly (alkylene glycol) segments. The polyisobutylene segments of the amphiphilic networks are physically crosslinked by hydrophobic forces. The amphiphilic networks have particular use as coatings for biological implants. Also provided is a process for preparing a physically crosslinked amphiphilic copolymer network comprising: providing a block copolymer comprising polyisobutylene segments and poly (alkylene glycol) segments; introducing the block copolymer into an aqueous solvent; and allowing the block copolymer to self-assemble into physically crosslinked a copolymer network.

18 Claims, 10 Drawing Sheets

OTHER PUBLICATIONS

E. Alami, M. Almgren, and W. Brown. "Aggregation of Hydrophobically End–Capped Polyethylene oxide) in Aqueous Solutions. Fluorescence and Light–Scattering Studies." Macromolecules 1996, vol. 29, p. 2229–2243.

A. Yekta, B. Xu, J. Duhamel, H. Adiwidjaja, and M.A. Winnik. "Flourescence Studies of Associating Polymers in Water: Determination of the Chain End Aggregation Number and a Model for the Association Process." Macromolecules 1995, vol. 28, p. 956–966.

G. Holden, H.E. Schroeder, R.P. Quirk (Eds.) Thermoplastic Elastomers: A Comprehensive Review, Hanser Pub., Munich, New York, 1996.

J.L. West and J.A. Hubbell. "Comparison of Covalently and Physically Cross–Linked Polyethylene Glycol–Based Hydrogels for the Prevention of Postoperative Adhesions in a Rat Model." Biomaterials 1995, vol. 16, No. 15, p. 1153–1156.

G. Kaszas, J.E. Puskas, J.P. Kennedy, and C.C. Chen. "Electron–pair Donors in Carbocationic Polymerization." J. Macromol. Sci.–Chem. 1989, vol. A26(8), p. 1099–1114.

C.C. Chen, J. Si, and J.P. Kennedy. "Living Carbocationic Polymerization. XLIX. Two–Stage Living Polymerization of Isobutylene to Di–tert–chlorine Telechelic Polyisobutylene." J. Macromol. Sci., Pure Appl. Chem 1992, vol. A29, No. 8, p. 669–679.

L. Wilczek and J.P. Kennedy. "Electrophilic Substitution of Organosilicon Compounds. II Synthesis of Allyl–Terminated Polyisobutylenes by Quantitative Allylation of tert–chloro–polyisobutylenes with Allyltrimethylsilane." Journal of Polymer Science, Part A: Polymer Chemistry 1987, vol. 25, p. 3255–3265.

L. Wilczek and J.P. Kennedy. "Electrophilic Substitution of Organosilicon Compounds. I. Model Studies of Allylation of tert–chlorine Ended Polyisobutylenes with Allyltrimethylsilane." Polymer Bulletin 1987, vol. 17, p. 37–43.

M. Dimonie and M. Teodorescu. "Phase Transfer Catalysis Synthesis of a,w–diallypoly(ethylene oxide)." Makromol. Chem Rapid Commun 1993, vol. 14, p. 303–307.

T.M. Marsalko, I. Majoros, and J.P. Kennedy. "Multi–Arm Star Polyisobutylenes." Polymer Bulletin 1993, vol. 31, p. 665–672.

L. Lestel, H. Cheradame, and S. Boileau. "Crosslinking of Polyether Networks by Hydrosilylation and Related Side Reactions." Polymer 1990, vol. 31, p. 1154–1157.

M.A. Sherman and J.P. Kennedy. "Novel Polyisobutylene/Poly(dimethylsiloxane) Bicomponent Networks. I. Synthesis and Characterization." Journal of Polymer Science: Part A: Polymer Chemistry 1998, vol. 36, p. 1891–1899.

Z.R. Zhang and M. Gottlieb. "Amphiphilic Poly(ethylene oxide)/poly(dimethylsiloxane)polymers: 1. Synthesis and Characterization of Cross–Linked Hydrogels." Thermochimica Acta 1999, vol. 336, p. 133–145.

T. Bogumil, S. Horing, H. Budde, K.F. Arndt. "Characterization of the PMMA–and PEO–, Di–and Triblock Copolymers, by Light Scattering, SEC and Vapour Pressure Osmometry." Polymer 1999, vol. 40, p. 1833–1837.

J.D. Tong, G. Moineau, P. Leclere, J.L. Bredas, R. Lazzaroni, and R. Jerome. "Synthesis, Morphology, and Mechanical Properties of Poly(methyl methacrylate)–b–poly(n–butyl acrylate)–b–poly(methyl methacrylate) Triblocks. Ligated Anionic Polymerization vs. Atom Transfer Radical Polymerization." Macromolecules 2000, vol. 33, p. 470–479.

Derwent WPI Acc. No. 1994–238874. English language abstract of J06172539 A.

Patent Abstracts of Japan, Publication No. 07173346. English language abstract of Japanese Application No. 05343256.

Kennedy, Joseph P., and Hongu, Yuji. "Synthesis and Characterization of Amphiphilic Polyisobutylene/Poly(Ethylene Glycol) Di–and Triblock Copolymers I. Synthesis of Di–and Triblock Copolymers." Polymer Bulletin. vol. 13, p. 115–121 (1985).

Kennedy, Joseph P., and Hongu, Yuji. "Synthesis and Characterization of Amphiphilic Polyisobutylene/Poly(Ethylene Glycol) Di–and Triblock Copolymers 2. Characterization of Polyisobutylene/Poly(Ethylene Glycol)." Polymer Bulletin, vol. 13, p. 123–130 (1985).

Wondraczek, Reinhard H., and Kennedy, Joseph P. "New Telechelic Polymers and Sequential Copolymers by Polyfunctional Initiator–Transfer Agents (Inifers) II. Synthesis, Extension and Crosslinking of Oxycarbonyl Isocyanate Telechelic Polyisobutylenes." Polymer Bulletin, vol. 4, p. 445–450 (1981).

* cited by examiner

PHYSICALLY CROSSLINKED AMPHIPHILIC NETWORKS, METHODS OF PREPARATION, AND USES THEREOF

TECHNICAL FIELD OF THE INVENTION

The present invention relates to physically crosslinked amphiphilic copolymer networks. The present invention more particularly relates to physically crosslinked amphiphilic copolymer networks comprising hydrophobic and hydrophilic segments, methods of preparation and uses thereof, such as for coatings for biological implants.

BACKGROUND OF THE INVENTION

An amphiphilic polymer network is a random assemblage of hydrophilic and hydrophobic polymer chains that is capable of swelling in both hydrophilic solvents (e.g., water) and hydrophobic solvents (e.g., a liquid hydrocarbon).

Chemically crosslinked amphiphilic polymer networks have been disclosed in the prior art. For example, U.S. Pat. No. 4,486,572 to Kennedy discloses the synthesis of styryl-telechelic polyisobutylene and amphiphilic networks comprising the copolymerization product of the styryl-telechelic polyisobutylene with vinyl acetate or N-vinyl-2-pyrollidone.

U.S. Pat. No. 4,942,204 to Kennedy discloses an amphiphilic copolymer network swellable in water or n-heptane but insoluble in either, comprising the product of the reaction of an acrylate or methacrylate of dialkylaminoalkyl with a hydrophobic bifunctional acryloyl or methacryloyl capped polyelofin. The preferred embodiment discloses an amphiphilic network having been synthesized by free-radical copolymerization of linear hydrophobic acrylate (A-PIB-A) or methacrylate (MA-PIB-MA) capped polyisobutylenes with 2-(dimethylamino)ethyl methacrylate (DMAEMA).

U.S. Pat. No. 5,073,381 to Ivan et al., a continuation-in-part of U.S. Pat. No. 4,942,204, discloses various amphiphilic copolymer networks that are swellable in water or n-heptane that comprise the reaction product of a hydrophobic linear acryloyl or methacryloyl capped polyolefin and a hydrophilic polyacrylate or polymethacrylate, such as N,N-dimethylacrylamide (DMAAm) and 2-hydroxyethyl methylmethacrylate (HEMA).

U.S. Pat. No. 4,085,168 to Milkovich et al. describes chemically joined, phase-separated self-cured hydrophilic thermoplastic graft copolymers which are copolymers of at least one hydrophilic (water soluble) ethylenically unsaturated monomer or mixture thereof and at least one copolymerizable hydrophobic macromolecular monomer having an end group which is copolymerizable with the hydrophilic monomer. The resulting copolymer is a graft copolymer characterized as having a comb-type structure consisting of a hydrophilic polymer backbone with hydrophobic polymer side chains bonded thereto. The side chains are disclosed as being bonded to the hydrophilic polymer at only one end of the side chain, so that no network results.

Some physically crosslinked polymer networks have been described in the prior art. One manner in which to physically crosslink a polymer involves hydrophobic bonding. Hydrophobic bonding refers to the attraction between hydrophobic or nonpolar portions of molecules, causing aggregation of the molecules.

Huglin et al. reported the preparation and characterization of physically crosslinked amphiphilic hydrogels comprised of copolymers of hydrophilic N-vinyl-2-pyrrolidone rich chain segments and hydrophobic methyl methacrylate rich segments. See *Preparation and Characterization of some linear copolymers as precursors to thermoplastic hydrogels.* Huglin, M. B. et al. *Eur. Polym. J.* 1994, Vol. 30, 457–463; *Effective crosslinking densities and elastic moduli of some physically crosslinked hydrogels.* Huglin, M. B. et al. *Polymer* 1995, Vol. 36, pp. 1 715–1718.

U.S. Pat. No. 5,972,375 to Truter et al. describes a translucent, water-insoluble hydrogel composition comprising a polyvinyl alcohol polymer and a complexing agent, which are physically crosslinked to form a semi-crystalline polyvinyl alcohol-complexing agent polymer complex.

U.S. Pat. No. 6,030,442 to Kabra et al. describes a microporous, fast response, crosslinked gel obtained from a cellulose ether. In one embodiment, the gel is physically crosslinked. The crosslinked gel has sufficient flexibility to enable said gel to be reversibly responsive to change in an environmental condition.

U.S. Pat. Nos. 5, 783,633, 5,786,425 and 5,786,426 to Sperling et al. describe biocompatible polyisoprene-polyurethane interpenetrating polymer network compositions, methods of producing the network compositions and medical devices fabricated from the network compositions. The biocompatible polyisoprene-polyurethane interpenetrating polymer network comprises chemically crosslinked polyisoprene and physically crosslinked polyurethane.

U.S. Pat. No. 5,252,692 to Lovy et al. describes amphoteric acrylic and methacrylic copolymers comprising cationic units of pendant N-substituted amidine and anionic units of acrylic or methacrylic acid carried by substituents of N-acrylamide, N-methacrylamide, N-acrylamidine or N-methacrylamidine. The copolymer networks can be either covalently or physically crosslinked.

U.S. Pat. No. 5,858,264 to Ichino et al describes a composite polymer electrolyte membrane which includes an ion-conductive polymer gel contained and supported by a matrix material of porous polytetrafluoroethylene membrane. An ion-conductive component is prepared by impregnating the porous polytetrafluoroethylene membrane with the polymer containing ion-conductive component and allowing the impregnated material to physically crosslink to form the composite polymer electrolyte membrane.

It is still desirable in the art to provide physically crosslinked amphiphilic copolymer networks having improved properties in relation to the physically crosslinked networks described in the prior art.

SUMMARY OF THE INVENTION

It is, therefore, an object of the present invention to provide a physically crosslinked amphiphilic copolymer network.

It is another object of the present invention to provide a method for producing a physically crosslinked amphiphilic copolymer network.

It is another object of the present invention to provide biocompatible coatings for biological implants.

These and other objects, together with the advantages thereof over the copolymer networks and coatings comprising amphiphilic polymer networks of the existing art, which shall become apparent from the specification which follows, are accomplished by the invention as hereinafter described and claimed.

The present invention, therefore, provides a physically crosslinked amphiphilic copolymer network comprising a block copolymer having hydrophobic polyisobutylene segments and hydrophilic poly(alkylene glycol) segments, wherein said polyisobutylene segments are physically crosslinked by hydrophobic forces.

The present invention also provides a process for preparing a physically crosslinked amphiphilic copolymer network comprising: providing a block copolymer comprising hydrophobic polyisobutylene segments and hydrophilic poly(alkylene glycol) segments; introducing the block copolymer into an aqueous solvent; and allowing the block copolymer to self-assemble into physically crosslinked a copolymer network. According to the method of the present invention, the hydrophobic polyisobutylene segments are physically crosslinked by hydrophobic forces.

The present invention further provides biocompatible coatings for implantable biological devices comprising a polymer network comprising hydrophobic polyisobutylene segments and hydrophilic poly(alkylene glycol) segments, wherein said hydrophobic segments of said polymer network are physically crosslinked by hydrophobic forces.

DETAILED DESCRIPTION OF THE INVENTION

Figure 1:
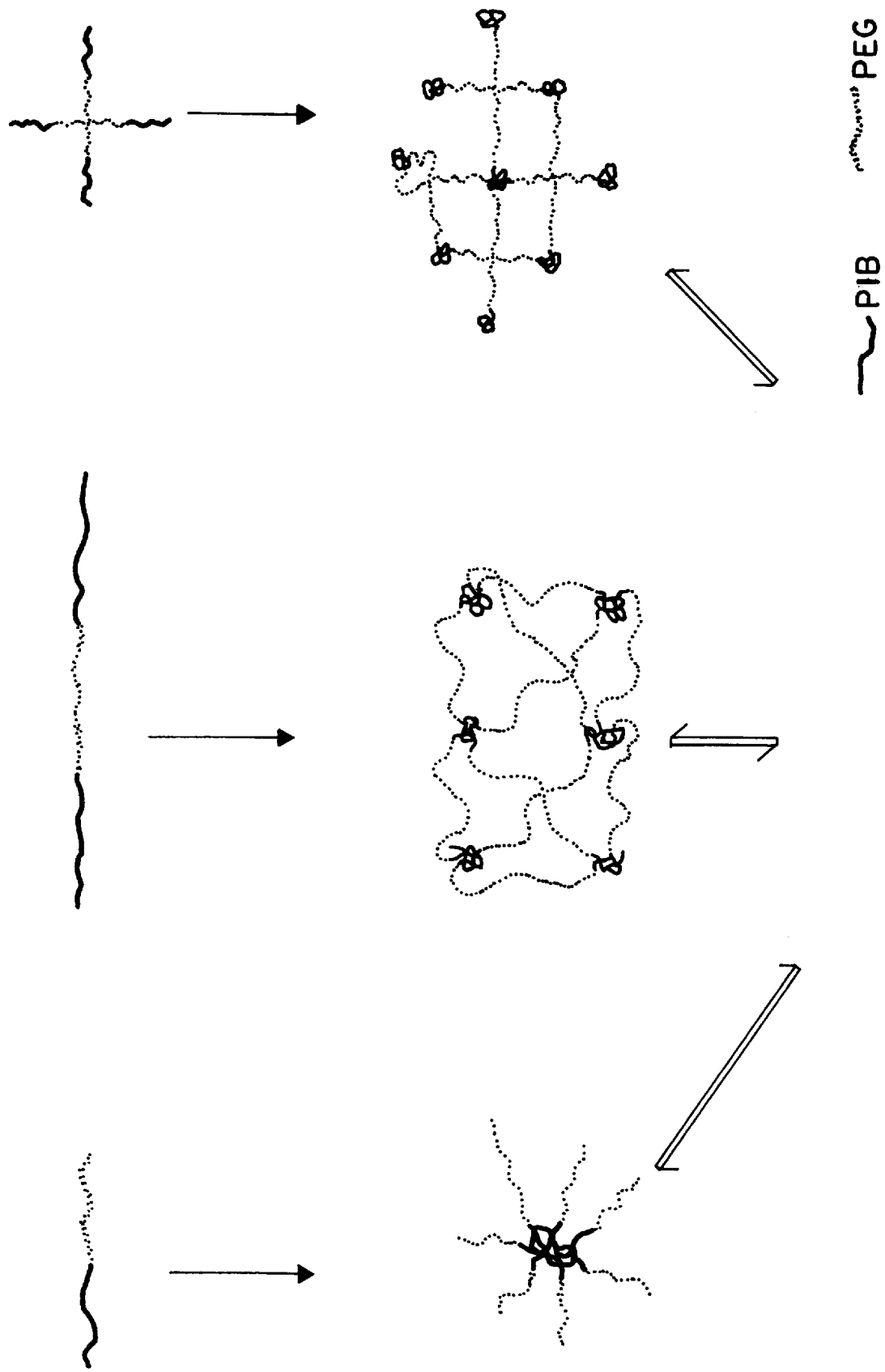
FIG. 1 is a schematic representation of the self-assembly of diblocks, triblocks and four-arm star blocks into physical crosslinked polymer networks in water.

A simple but efficient strategy is described for the synthesis of novel di-, tri-, multi-, and star-block amphiphilic copolymer networks comprising hydrophobic and hydrophilic segments where the hydrophobic segments of the copolymer are physically crosslinked. The block copolymers can self-assemble into network structures and no chemical bonding, covalent or otherwise, occurs between the hydrophilic segments and the hydrophobic segments of the copolymer network. According to the present invention, the hydrophobic segments are physically crosslinked by hydrophobic forces to form a self-assembled, physically crosslinked amphiphilic copolymer network. Physical crosslinking occurs through hydrophobic bonding or interactions of the hydrophobic segments of the block copolymers. Hydrophobic bonding refers to the attraction between hydrophobic or nonpolar portions of molecules, causing aggregation of the molecules.

An amphiphilic polymer network is a random assemblage of hydrophilic and hydrophobic polymer segments that is capable of swelling in both hydrophilic solvents (e.g., water) and hydrophobic solvents (e.g., a liquid hydrocarbon), but is insoluble in either.

Polyolefins, such as polyisobutylene (PIB) are utilized as the hydrophobic segments of the amphiphilic membrane of the present invention. The word polyisobutylene and the abbreviation PIB refer to the same hydrophobic segments of the block copolymer, and are used interchangeably in this specification.

The present invention utilizes poly(alkylene glycols) as the hydrophilic segments of the physically crosslinked networks. Suitable poly(alkylene glycols) include, but are not limited to poly(ethylene glycol), poly(propylene glycol) and poly(butylene glycol). The word poly(ethylene glycol) and the abbreviation PEG refer to the same hydrophilic segments and are used interchangeably in this specification.

In one preferred embodiment, the amphiphilic copolymer networks comprise poly(ethylene glycol) (PEG) as the hydrophilic segments of the block copolymer and polyisobutylene (PIB) as the hydrophobic segments.

In general, the present invention also provides a method for preparing a physically crosslinked amphiphilic copolymer network. The method includes providing a block copolymer having hydrophobic segments and hydrophilic segments. The block copolymer having hydrophobic segments and hydrophilic segments is introduced into an aqueous medium, and the block copolymer is allowed to self-assemble into physically crosslinked a copolymer network.

In one preferred embodiment, the process of the present invention involves the coupling of appropriately terminally-functionalized PEG and PIB sequences, specifically, the hydrosilation of mono-, di-, and tetra-allyl-telechelic PEGs (PEG-allyl, allyl-PEG-allyl and C(—PEG-allyl)$_4$) by mono- and di—Si(CH$_3$)$_2$H telechelic PIBs (PIB—SiH and HiS—PIB—SiH). Representative block copolymers, e.g., PEG—PIB, PIB—PEG—PIB, (—PIB—PEG—)n and C(—PEG—PIB)$_4$ can be assembled and their structures determined by $^1$H and $^{13}$C NMR spectroscopy. For the multiblock copolymer, (—PIB—PEG—)$_n$, n is a positive integer from 3 to 10, more preferably from 3 to 4.

The block copolymers of the present invention contain from about 50 to about 70 weight percent polyisobutylene produce hydrogels, and whose integrity is maintained by physical crosslinks of the polyisobutylene segments.

FIG. 1 shows three representative self-assembled physically crosslinked amphiphilic copolymer networks of the present invention in water. The representative amphiphilic copolymer networks comprise one of an amphiphilic diblock, triblock, and a four arm star-block copolymer comprised of PIB and PEG moieties. The hydrophobic polyisobutylene segments aggregate into tight coils or domains, which function as physical crosslinks for the extended swollen hydrophilic chains.

Among the advantages of physically crosslinked membranes held together by hydrophobic forces over chemically crosslinked networks are solubility in select solvents and ease of processibility. Physical crosslinks of the hydrophobic segments of the amphiphilic copolymer network allows melt and solution processing. The physically crosslinked copolymer networks can be utilized in solvent or spin casting, spinning, and drawing techniques, such that the networks can be shaped into any geometric shape or form including, but not limited to, films, sheets, blocks, beads, tubes, capsules, spheres, and cones.

Without being bound to any particular theory, it is believed that the structural integrity of physically crosslinked amphiphilic networks of the present invention is due to the thermodynamic incompatibility between the hydrophobic and hydrophilic segments, and the network is held together by hydrophobic forces acting between hydrophobic domain embedded in the continuous water swollen hydrophilic phase. The driving force for self-organization of the amphiphilic block copolymers is, therefore, segmental incompatibility.

Several methods can be used to couple PEG and PIB segments together, including, but not limited to, coupling phenol-terminated PIB with tosylated PEG, inking PIB and PEG blocks together by isocynate chemistry and by Williamson ether synthesis.

In one preferred embodiment, various PIB/PEG diblocks, triblocks, multiblocks and star-blocks can be formed with near quantitative conversion. Preferably, the block copolymers are formed by end-functionalizing PIB with —Si(CH$_3$)$_2$H, followed by hydrosilation with allyl-terminated PEG, resulting in stable Si—C linkages.

Preparation of block copolymers is well known to one having ordinary skill in the art. The block copolymers, according to the present invention, may by prepared by dissolving prepolymers in an organic solvent at the reaction temperature, and slowly removing the solvent after hydrosilation under anhydrous conditions.

Suitable organic solvents include, but are not limited to toluene, tetrahydrofuran (THF), benzene, chloroform, methylene chloride, carbon disulfide and chlorobenzene. Toluene is the preferred solvent, because it is a good solvent for both PIB and PEG segments.

The reaction is carried out at a temperature in the range of about 20 to about 100° C., preferably from about 50 to about 70° C. and more preferably from about 55 to about 65° C.

In one preferred embodiment, the amphiphilic copolymer network of the present invention comprises hydrophobic polyisobutylene segments (PIB) and hydrophilic poly (ethylene glycol) segments (PEG). Allyl-terminated PIB is reacted with dimethylchlorosilane as follows:

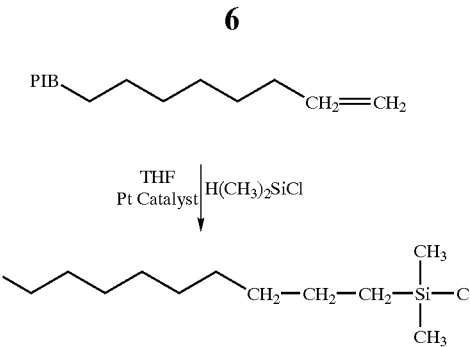

The SiCl-functionalized polyisobutylene is then reduced with LiAlH$_4$ as follows:

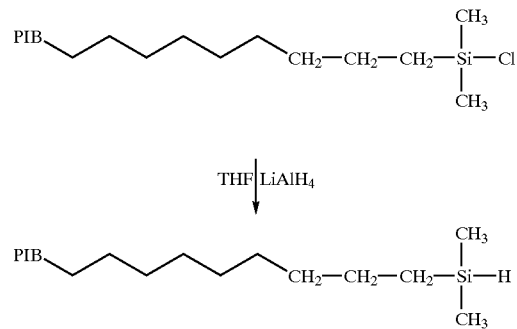

The block copolymers are then formed by hydrosilating allyl-terminated PEG with PIB—SiH as in the general reaction scheme below:

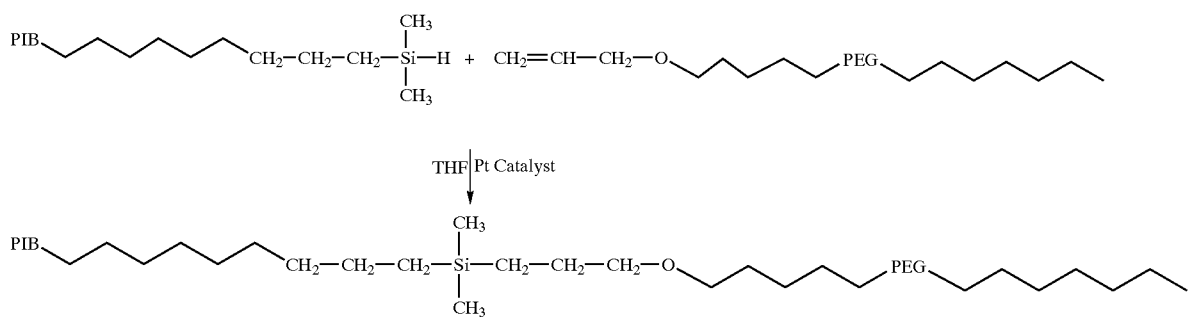

GENERAL EXPERIMENTAL

The following examples are set forth to describe the physically crosslinked networks of the present invention in further detail and to illustrate the methods of preparation of the present invention. However, the examples should not be construed as limiting the present invention in any manner. Throughout this specification and claims, all percentages are by weight and are based on the total polymer network weight unless otherwise specifically stated.

Molecular weights and molecular weight distributions ($M_w/M_n$) were determined by a Waters GPC instrument equipped with a series of five $\mu$-styragel columns (100, 500, $10^3$, $10^4$, and $10^5$ Å) calibrated with narrow molecular weight distribution PIB standards, a Waters 420 differential refractometer (DRI), a Waters 2487 dual $\lambda$ absorbance detector (UV); and a Wyatt Technology Minidawn Laser-Light Scattering (LLS) detector (Wyatt Technology Corporation, Santa Barbara, Calif.). The flow rate was 1 mL of THF/min. Astra and Chromperfect softwares were used for data analysis.

Fourier Transform Infrared (FTIR) spectroscopy; (ATI Mattson Genesis Series FTIR, Matson Instrument, Madison, Wis.) was used to confirm the conversion of $\alpha,\omega$-dihydroxy PEG to $\alpha,\omega$-diallyl PEG.

$^1$H NMR (Varian Gemini-300 or Varian Unityplus-750 Spectrometer) spectroscopy was used to quantitative allyl and SiH functionalities and to characterize structures of and molecular weights of triblocks and star blocks. Sample concentration was 40 mg/0.75 mL in $CDCl_3$ or $CD_2Cl_2$.

Differential Scanning Calorimetry (DSC) was performed by a Dupont 2100 thermal analyzer under nitrogen atmosphere with a heating rate of 5° C./min. The melting point ($T_m$) was defined as the minimum of the DSC endotherm.

Equilibrium swelling studies were carried out by immersing samples in distilled water for 24 hours at room temperature. Equilibrium swelling was reached, as indicated by the absence of swelling after 24 hours. The degree of swelling, $d_{sw}$, was calculated by $$d_{sw} = \frac{W_{block\ wet} - W_{block\ dry}}{W_{block\ dry}}$$

where W is the weight in grams.

Surface topology and topographical mapping were investigated by Atomic Force Microscopy (AFM) (Dimension 3100, Digital Instruments, Santa Barbara, Calif.) in tapping mode (height and phase). Samples were spin coated from THF or toluene onto a silicone wafer. Measurements were carried out at ambient conditions in air and in water.

The following symbolism is used in Tables I and II, below, to identify block copolymers: PEG($M_{n,PEG}$)-PIB($M_{n,PIB}$), where $M_{n,PEG}$ and $M_{n,PIB}$ are the number average molecular weights of the PEG and PIB segments×$10^3$. For example, C(PEG(5)-PIB(2.5))$_4$ stands for a four-arm star-block copolymer consisting of a PEG block of 5000 g/mol and a PIB block of 2500 g/mol.

All reagents and solvents used were of reagent grade or higher purity. Hydrochloric acid, sodium sulfate, magnesium sulfate, hexanes, tetrahydrofuran, methylene chloride, methanol, acetone and toluene were obtained from Fischer Scientific. Potassium hydroxide, $LiAlH_4$, $TiCl_4$, dimethylacetamide (DMA), di-tert-butylpyridine (DtBP), allyltrimethylsilane (ATMS), $\alpha$-methylstyrene, allyl bromide, sodium hydroxide and $\alpha,\omega$-dihydroxy PEG were obtained from Aldrich and were used as received.

Monofunctional PEG was from Fluka Chemicals. Dimethyl chlorosilane and Karstedt's catalyst (Pt with 1,3-divinyltetramethyldisiloxane in xylene solution) were from Gelest Chemicals and used as received. The four arm PEG stars ($M_n$ 8,800 and 20,000 g/mol) were from Polymer Source Inc. (Montreal, Quebec). Isobutylene (IB (CP grade)) and methyl chloride ($CH_3Cl$) were obtained from Matheson and dried by passing the gases through columns packed with activated BaO/Drierite/$CaCl_2$ and molecular sieves, and condensed under $N_2$. 1,4-Bis(2-chloro-2-propyl)benzene (dicumyl chloride, DcumCl) was prepared from 1,4-bis(2-hydroxy-2-propyl)benzene (dicumyl alcohol).

Synthesis of SiH terminated PIB (PIB—SiH)

Allyl-terminated polyisobutylene (allyl-PIB) was synthesized by living carbocationic polymerization of isobutylene by a CumCl/$TiCl_4$/DMA/−80° C. system, followed by end-quenching with ATMS. The molecular weights and molecular weight distribution of the allyl-terminated polyisobutylene blocks are given in Table I, below.

TABLE I

| | | Synthesized Block Copolymers | | | | | |
|---|---|---|---|---|---|---|---|
| | | Starting Segments | | | | Block Copolymers | |
| | | PIB-block | | PEG-block | | | |
| Example | | $M_n$ (g/mol) | $M_w/M_n$ | $M_n$ (g/mol) | PIB/PEG Ratio | PIB wt. % | $M_n^a$ g/mol |
| 1 | PIB-PEG | 2500 | 1.08 | 5000 | 0.5 | 33.3 | 7500 |
| 2 | PIB-PEG-PIB | 9900 | 1.07 | 6800 | 2.91 | 74.4 | 26600 |
| 3 | PIB-PEG-PIB | 8200 | 1.03 | 10000 | 1.64 | 62.1 | 26400 |
| 4 | PIB-PEG-PIB | 2500 | 1.08 | 4600 | 1.09 | 52.1 | 9600 |
| 5 | PIB-PEG-PIB | 2500 | 1.08 | 2000 | 2.5 | 71.4 | 7000 |
| 6 | (-PIB-PEG-)$_3$ | 5140 | 1.06 | 4600 | 1.12 | 52.7 | 29280 |
| 7 | C(PEG-PIB))$_4$ | 8200 | 1.03 | 2200$^b$ | 3.72 | 78.8 | 41600 |
| 8 | C(PEG-PIB))$_4$ | 2500 | 1.08 | 5000$^b$ | 0.5 | 33.3 | 30000 |

$^a$calculated from the starting segments
$^b$per arm

Figure 2:
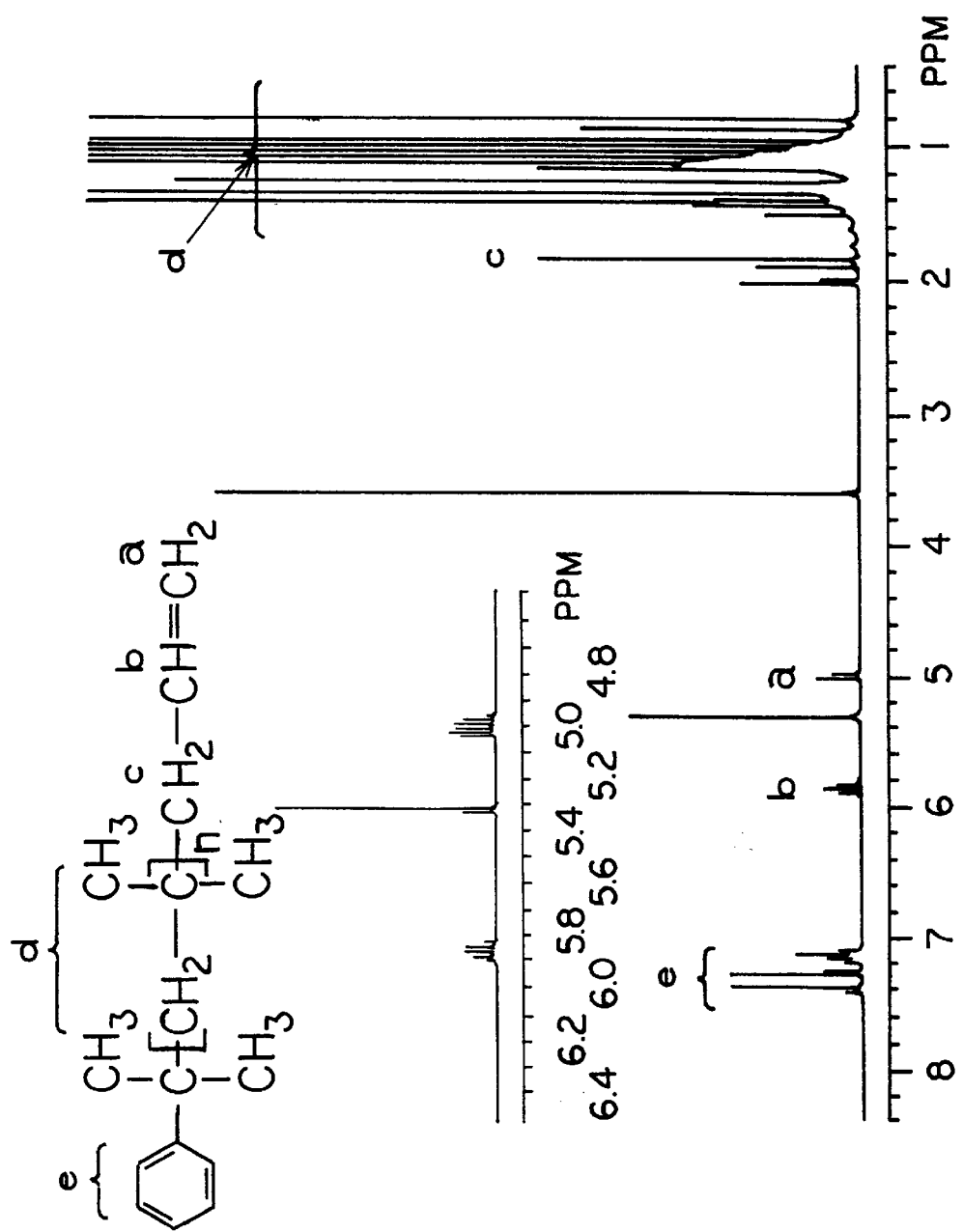
FIG. 2 is a schematic representation of the $^1$H NMR spectrum of allyl-PIB ($M_n$2,500 g/mol; Example 1 in Table I)
Figure 3:
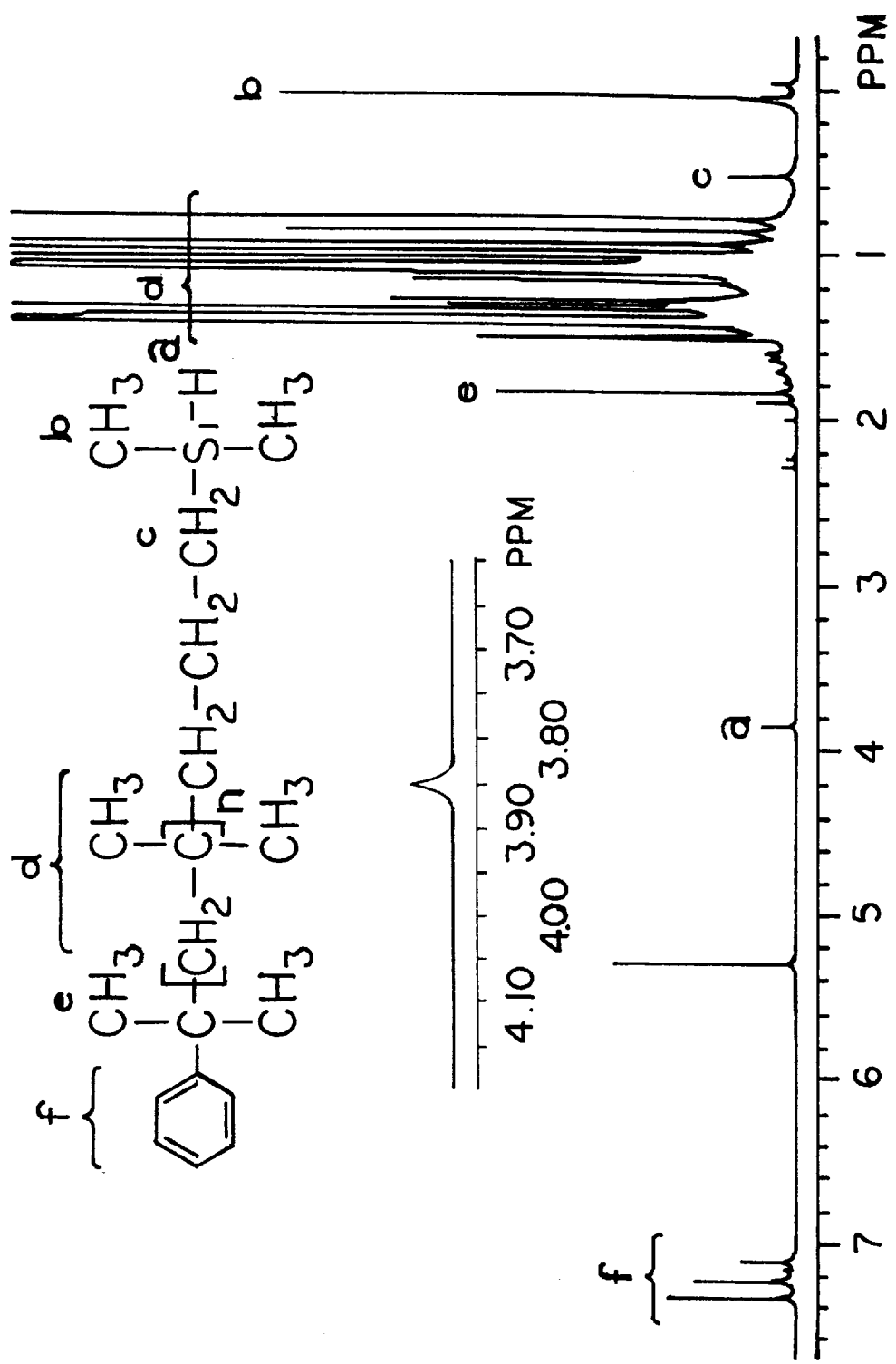
FIG. 3 is a schematic representation of the $^1$H NMR spectrum of PIB-SiH ($M_n$2,500 g/mol; Example 4 in Table I)

FIG. 2 shows the $^1$H NMR spectrum of the allyl-terminated PIB ($M_n$ 2,500 g/mol, $M_w/M_n$ 1.08) of Example No. 1. The functionality was calculated by comparison of the integrated signal areas of the protons at 7.1–7.3 ppm of the aromatic initiator residue to the allyl protons at 5.1–5.3 and 5.8–5.9 ppm afforded by 300 or 750 MHz $^1$H NMR spectroscopy. The functionality of the prepolymers was >98% by this technique.

The SiH functionalization of allyl-terminated polyisobutylene was effected by hydrosilation of allyl-polyisobutylene with dimethylchlorosilane. Specifically, the allyl-terminated polyisobutylene of Example No. 1 was dissolved in dry THF under $N_2$ and reacted with five times molar excess of dimethylchlorosilane for 48 hours at about 50° C. in the presence of Karstedt's catalyst (600 ppm platinum relative to allyl groups). After the disappearance of the allyl protons by $^1$H NMR spectroscopy, 40 times excess $LiAlH_4$ in THF was introduced dropwise to the stirred solution. The charge was stirred under $N_2$ at room temperature for 24 hours, stored for 48 hours, the polymer phase was removed, and dried by a rotary evaporator. The product was dissolved in hexanes, centrifuged for several hours to remove the LiAlH$_4$ and dried under vacuum. This process was repeated several times to minimize the amount of LiAlH$_4$ residues in the product. The SiH end group was quantitated by $^1$H NMR spectroscopy by comparison of the relative intensities of the resonances at 7.1–7.3 ppm associated with the aromatic initiator residue in the prepolymer (internal standard), to the resonances at 3.8 ppm associated with the terminal SiH protons. The SiH—PIB—SiH for the multiblock was prepared similarly from allyl-PIB-allyl.

Reactions other than hydrosilation may also consume SiH. For example, the hydrolysis of SiH may be converted to SiOH in the presence of platinum catalyst and minute amounts of water. The resulting SiOH may condense or may react with SiH to form Si—O—Si linkages. To avoid these side reactions, syntheses were carried out under anhydrous conditions. Reactions carried out with PIB—SiH and platinum catalyst showed no change in molecular weights and molecular weight distributions by gel permeation chromatography, indicating the absence of Si—O—Si linkages.

Synthesis of allyl-terminated poly(ethylene glycol)

α,ω-diallyl poly(ethylene glycol) (allyl-PEG-allyl) was prepared by reacting (α,ω-dihydroxy poly(ethylene glycol) with excess allyl bromide over NaOH powder in toluene for 12 hours at about 45° C. The liquid was decanted and the solvent removed by rotary evaporator. The product was dissolved in water, extracted with CH$_2$Cl$_2$ four times, dried over Na$_2$SO$_4$, and the solvent was removed by a rotary evaporator. The resulting white power was recrystallized in diethyl ether and dried under vacuum. The monofunctional poly(ethylene glycol) and the four poly(ethylene glycol) arm stars were functionalized similarly. The allyl functionality of the products was >97% by nuclear magnetic resonance (NMR) and FTIR spectroscopies, and matrix assisted laser desorption ionization (MALDI).

Mono-allyl poly(ethylene glycol), α,ω-diallyl poly(ethylene glycol), and four arm allyl poly(ethylene glycol)-stars were prepared from the corresponding hydroxy poly(ethylene glycol)s by Williamson ether synthesis, as described hereinabove. The hydroxy poly(ethylene glycol)s were reacted with allyl bromide in the presence of NaOH powder in toluene. Under these conditions the hydroxyl group of poly(ethylene glycol) is ionized and the corresponding alkoxide displaces the bromide. The disappearance of hydroxyl groups were followed by FTIR spectroscopy. After about 12 hours, the peak corresponding to the hydroxyl group at about 3,500 cm$^{-1}$ disappeared and allyl end-functionalized poly(ethylene glycol) were obtained. The FTIR spectra of all functionalized poly(ethylene glycol) samples were similar.

Figure 4:
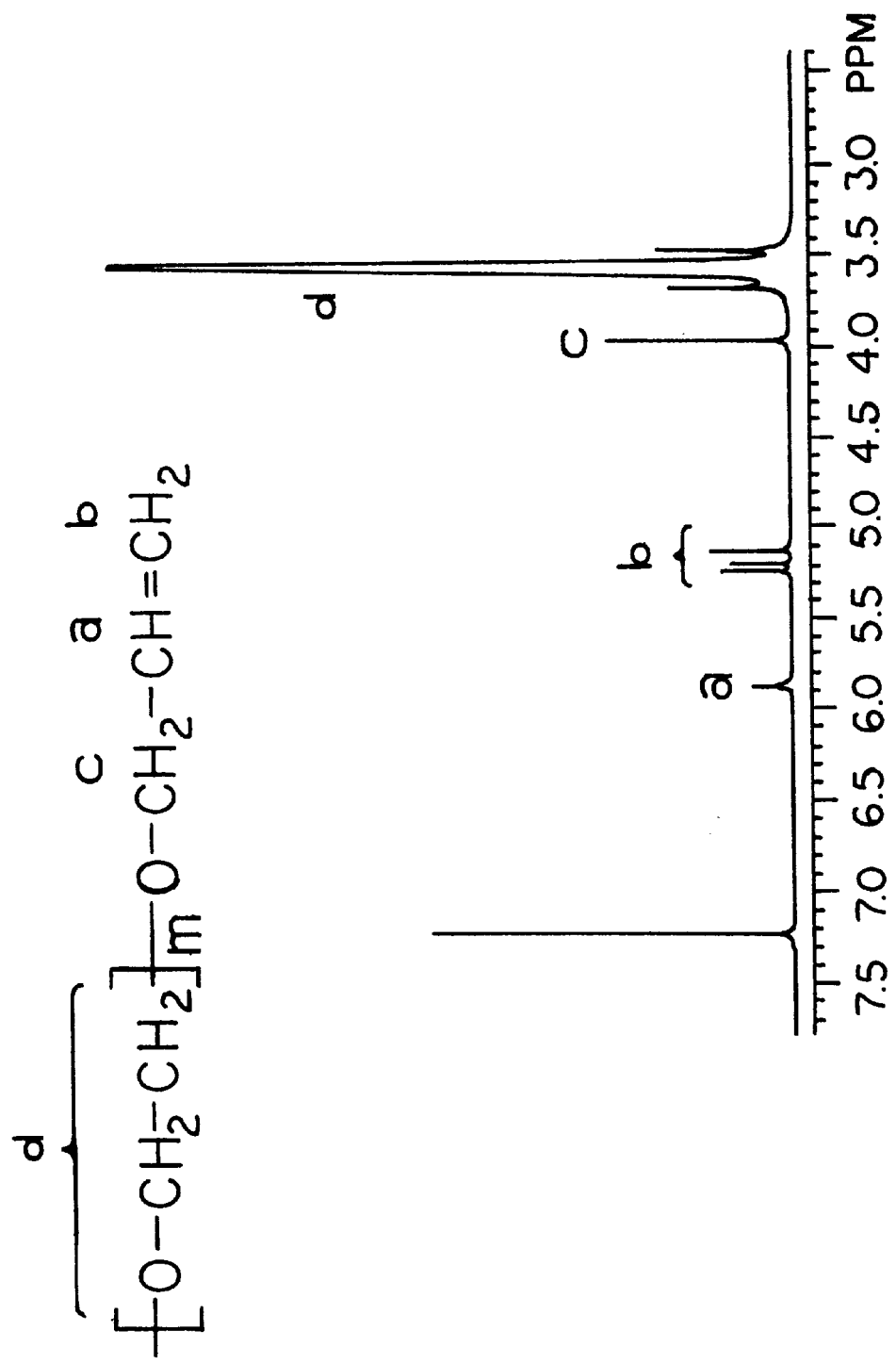
FIG. 4 is a schematic representation of the $^1$H NMR spectrum of allyl-PEG-allyl ($M_n$4,600 g/mol; Example 4 in Table I)

$^1$H NMR and $^{13}$C NMR spectroscopies also indicated quantitative conversions of poly(ethylene glycol) hydroxyls to allyl groups. FIG. 4 shows a representative $^1$H NMR spectrum of an allyl-PEG-allyl. The resonance at 2.6 ppm associated with OH groups at has disappeared, while the resonances at 5.1–5.3 and 5.8–5.9 ppm associated with the allyl group have appeared.

Figure 5:
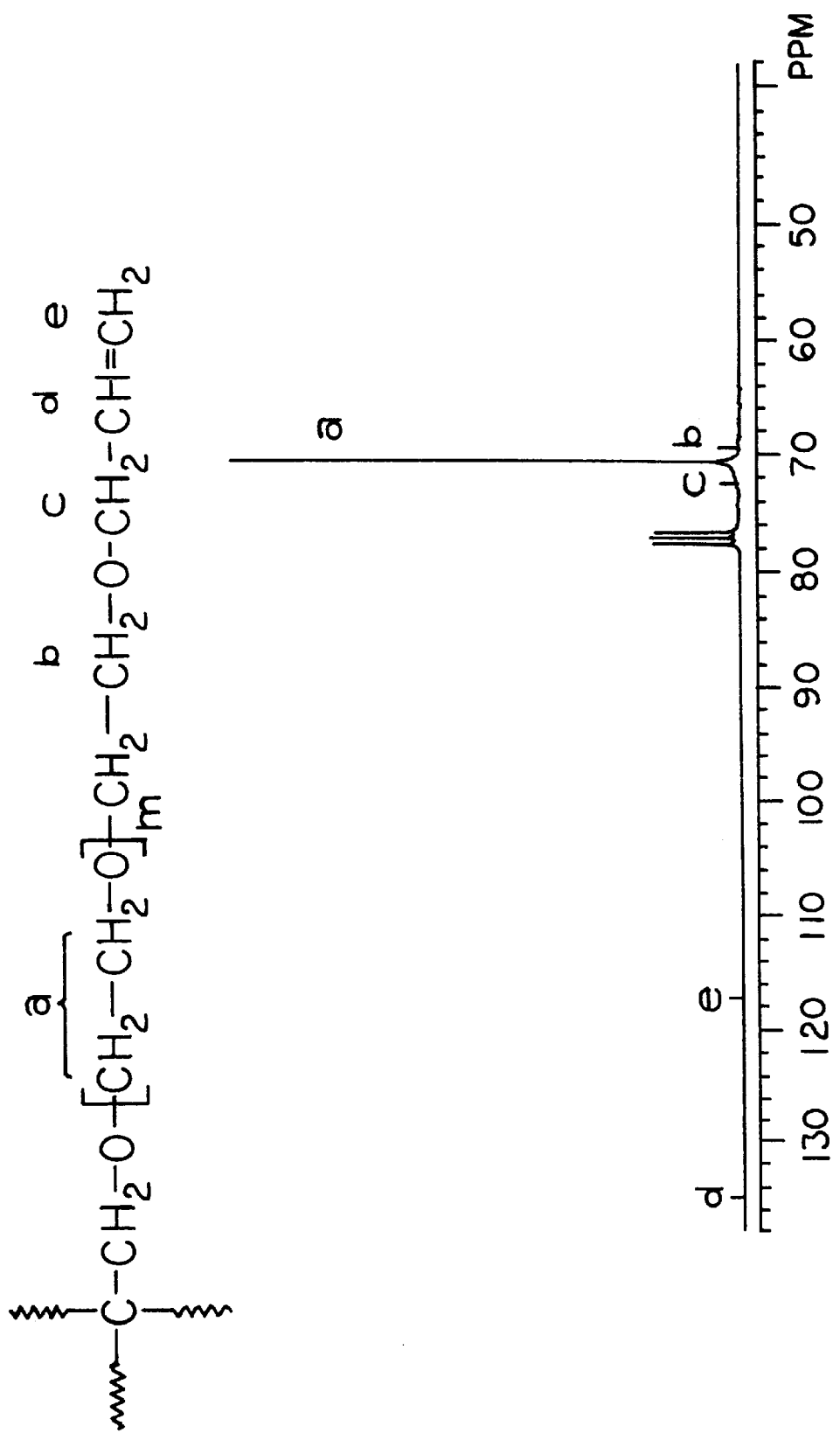
FIG. 5 is a schematic representation of the $^{13}$C NMR spectrum of C(—PEG-allyl)$_4$ ($M_n$8,800 g/mol; Example 7 in Table I).

Characterization by $^{13}$C NMR spectroscopy also proved quantitative allylation. The resonance at about 62 ppm indicating —CH$_2$OH has disappeared while those showing the presence of —CH$_2$—CH=CH$_2$ appeared at about 116 ppm and about 135 ppm, respectively (FIG. 5). Quantitative conversion to the allyl functionality was further confirmed by matrix assisted laser desorption ionization analysis.

Synthesis of Block Copolymers

Block copolymers were synthesized by hydrosilation of allyl-ended PEGs with PIB—Si H in the presence of Karstedt's catalyst. The diblock (PIB—PEG) was prepared by reacting equimolar amounts of PEG-allyl with PIB—SiH. The synthesis of triblocks (PIB—PEG—PIB) was achieved by reacting equimolar amounts of PIB—SiH with allyl-PEG-allyl (i.e., [SiH]/[allyl]=1). The star-blocks (C(PEG—PIB)$_4$) were obtained similarly by reacting the allyl-terminated arms of four-arm star PEGs with PIB—SiH. Multiblocks were prepared similarly by reacting equimolar concentrations of HSi—PIB—SiH and allyl-PEG-allyl.

PIB—SiH and allyl-terminated PEGs (linear and stars) were dissolved in anhydrous toluene at about 45° C. under argon. Reactions were initiated by the addition of Karstedt's catalyst (600 ppm platinum relative to SiH). The homogenous charge was stirred at 60° C. for 48 hours under argon, after which the solvent was removed by a rotary evaporator and the product was further dried under vacuum. Depending on the composition of the block copolymers, unreacted materials were removed by sequential extractions of swollen materials with hexanes and water.

High molecular weight PIB and PEG (M$_n$>2×10$^4$ g/mol) are incompatible. The mutual solubility of lower molecular weight PIB and PEG segments designed for the preparation of amphiphilic block copolymers in THF and toluene was examined in a series of orienting experiments: Thus 1 g of each of various molecular weight PIB and PEG (e.g., M$_{n,PIB}$=10,000 g/mol and M$_{n,PEG}$=4,600 g/mol) were mixed and dissolved in 25 mL toluene and THF, good solvents for both segments, and the solutions were placed in 100 mL glass cylinders. Inspection of the solutions after one week of undisturbed storage at room temperature showed no evidence of phase separation. Had the solutions of these prepolymers been incompatible in solution, phase separation in toluene or THF (meniscus formation between two liquid phases) would have been observed. These simple but powerful compatibility tests confirmed that the envisioned syntheses would not be prevented by massive phase separation in solution.

Figure 6:
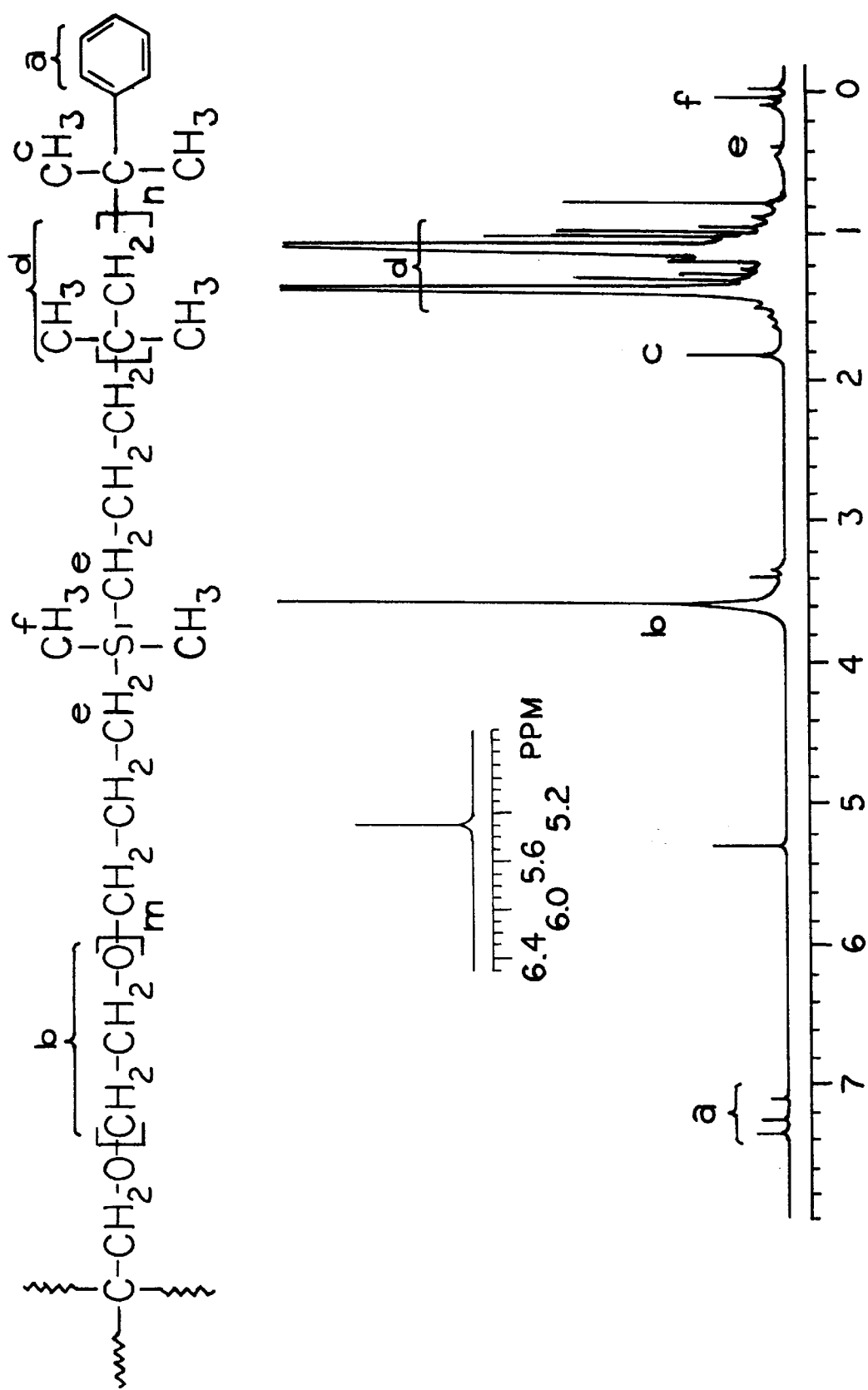
FIG. 6 is a schematic representation of the $^1$H NMR spectrum of C(—PEG(2.2)-PIB(8.2))$_4$.

FIG. 6 shows a representative $^1$H NMR spectrum of a star-block (C(PEG(8.2)-PIB2.2)$_4$) together with resonance assignments. The absence of allyl and SiH resonances indicates that these groups have reacted.

The number average molecular weights of representative block copolymers have been determined by $^1$H NMR (750 MHz) spectroscopy. Thus the relative intensity of the signals for the aromatic initiator residue and the Si(CH$_3$)$_2$ protons (internal standards) showed good agreement with theoretical values. For example, the M$_n$'s calculated from NMR data for triblock of Example No. 4 and four arm star-block of Example No. 8 had molecular weights of 10,040 and 29,600 g/mol, respectively.

Gel Permeation Chromatography

Figure 7:
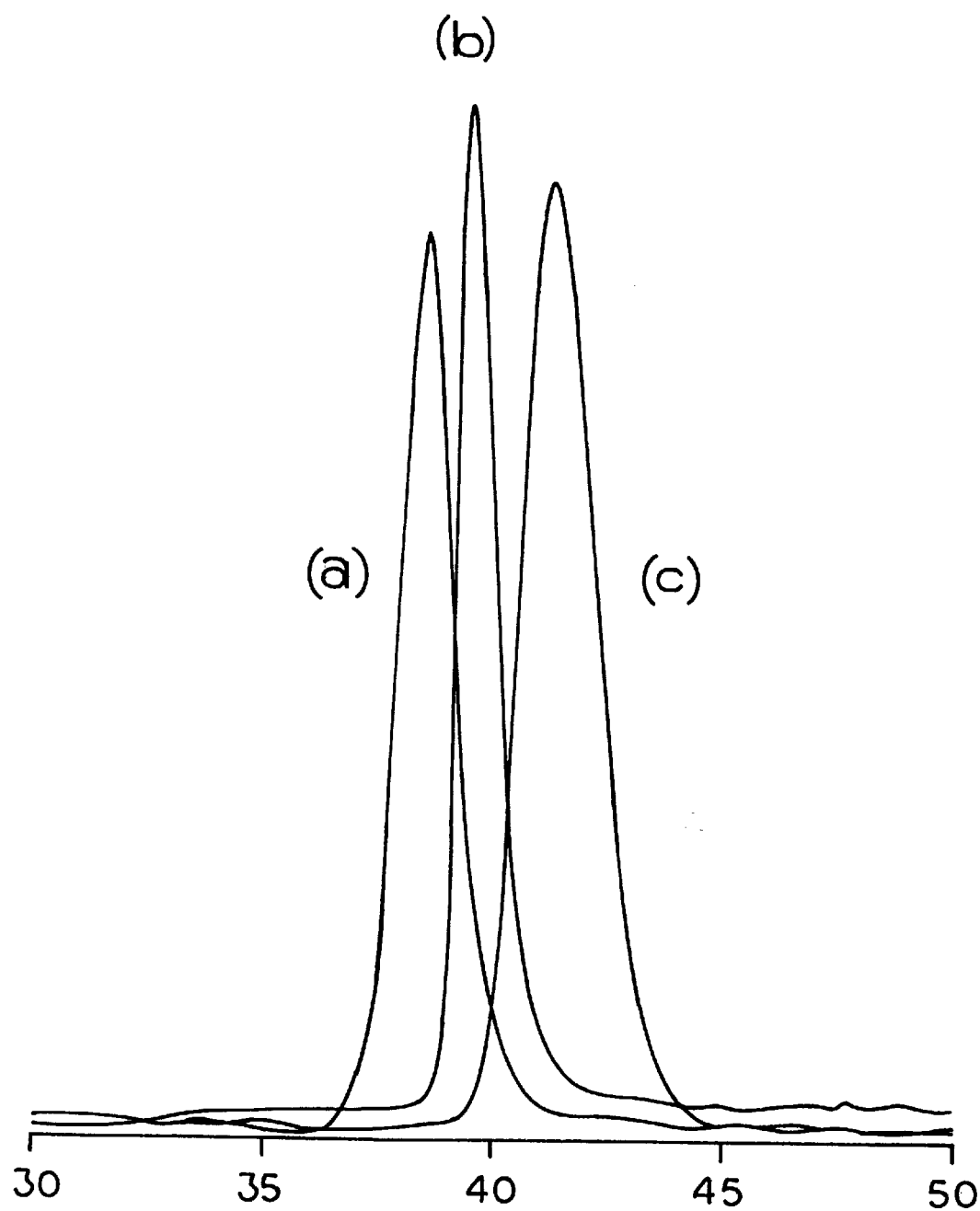
FIG. 7 is a schematic representation of the gel permeation chromatograms for (a)PIB(2.5)-PEG(4.6)-PIB(2.5), (b) PEG 4,600 g/mol, and (c) PIB 2,500 g/mol.

The homogeneity of the block copolymers used in the present invention were determined by gel permeation chromatography. FIG. 7 shows gel 5 permeation chromatography traces of the triblock, PIB(2.5)-PEG(4.6)-PIB(2.5) (M$_n$=9, 600 g/mol) together with those of the prepolymers, PIB(2.5) and PEG(4.6), used in the synthesis. The gel permeation chromatography trace of the PIB(2.5)-PEG(4.6)-PlB(2.5) triblock shows a monomodal, narrow, near symmetrical molecular weight distribution indicating the essential absence of contamination by unreacted stating materials, at least within the limits of gel permeation chromatography detection.

According to the position of the gel permeation chromatography peak, the apparent molecular weight of this triblock is about 12,300 g/mol. The poly(ethylene glycol) prepolymer having a molecular weight of $M_n$=4,600 g/mol showed an apparent $M_n$=7,800 g/mol which, in conjunction with $M_{n,PIB}$=2,500 g/mol, yields $M_n$=12,800 g/mol for the triblock.

Thermal Properties

Figure 8:
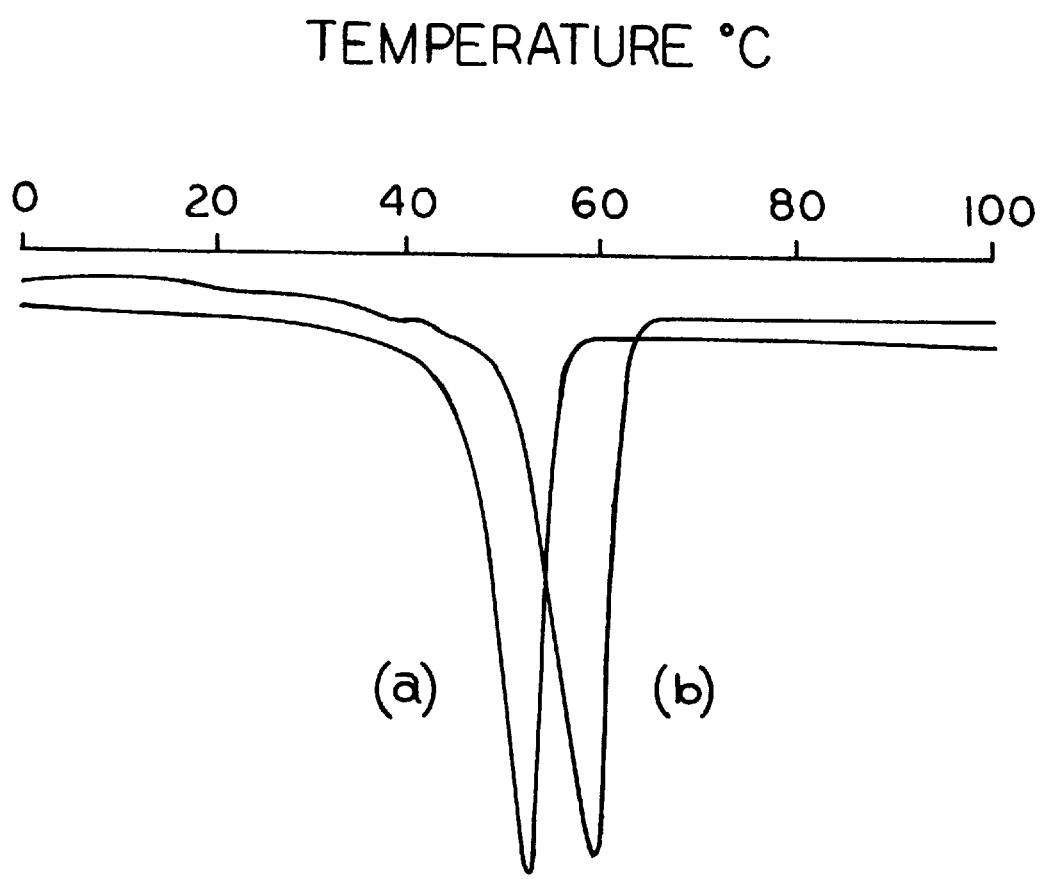
FIG. 8 is a schematic representation of the DSC traces of (a) PIB(2.5)-PEG(4.6)-PIB(2.5) and (b) starting material PEG 4,600 g/mol.

FIG. 8 shows part of the DSC traces of a triblock copolymer PIB(2.5)-PEG(4.6)-PIB(2.5) and the starting PEG(4,6) prepolymer. According to this data the PIB—PEG—PIB triblock exhibits phase separation with $T_{g,PIB}$=−73° C. and $T_{m,pEG}$=59.4° C. Attaching PIB chains at both ends of a PEG segment changes the crystalline lamella morphology of the PEG segment. Crystallization of the PEG segment in the triblock is restricted and the melting point of the PEG segment is reduced to 52.6° C.

In contrast, the diblock of Example No. 1 of Table I showed only about 1° C. reduction in the $T_m$ of the PEG segment. This is most likely due to the fact that the PEG segment in the diblock had twice the length of the PIB segment, and that the PIB segment was attached only at one end of the PEG segment.

Swelling Properties

The swelling properties of the amphiphilic copolymer networks in water was investigated. The amphiphilic copolymer networks of Example Nos. 1–7 of Table I swelled when placed in water. The swelling properties of the block copolymers of the present invention are shown in Table II, below.

than about 74 weight percent PIB swelled both in water and in hexanes which suggests a cocontinuous hydrophilic/hydrophobic phase arrangement. Block copolymers with about 50 to about 70 weight percent PIB gave weak elastic hydrogels held together by the hydrophobic force acting between the PIB moieties.

The block copolymers of Example Nos. 3–6 of Table 11 gave opaque solutions in THF and toluene at room temperature, however, became transparent, clear and homogeneous upon gently heating to about 40° C. This phenomenon is reversible and cooling the clear solutions to ambient temperature restored opaqueness.

Thin films cast from toluene and placed in water gave swollen films that floated in water. Removing these films from water caused them to collapse, however, replacing them into water restored their original shape.

Surface Properties Studies

Figure 9:
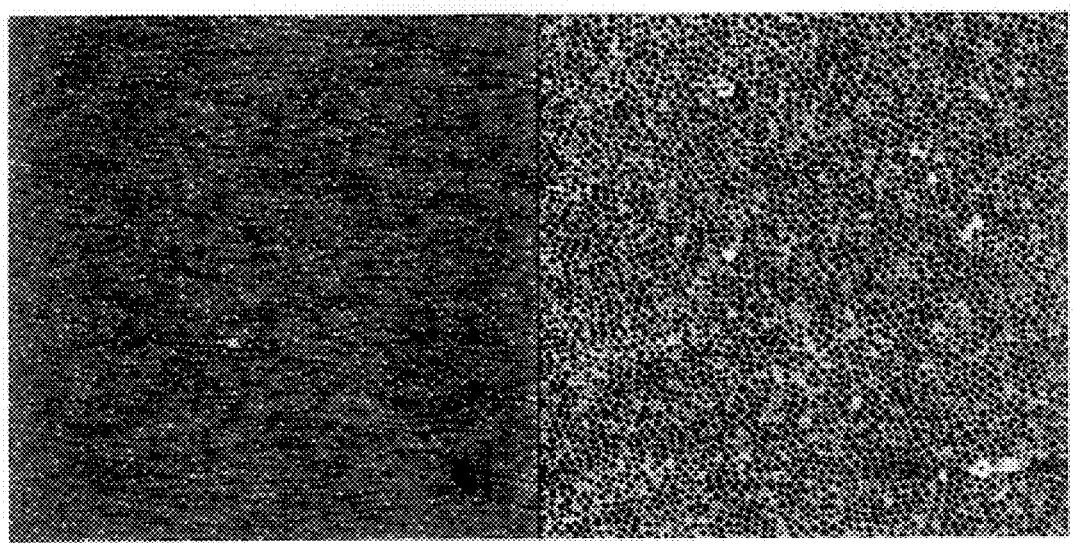
FIG. 9 is a photomicrograph of the AFM height and phase images obtained from triblock (PIB(9.9)-PEG(6.8)-PIB(9.9)) in contact with water for four hours.
Figure 10A:
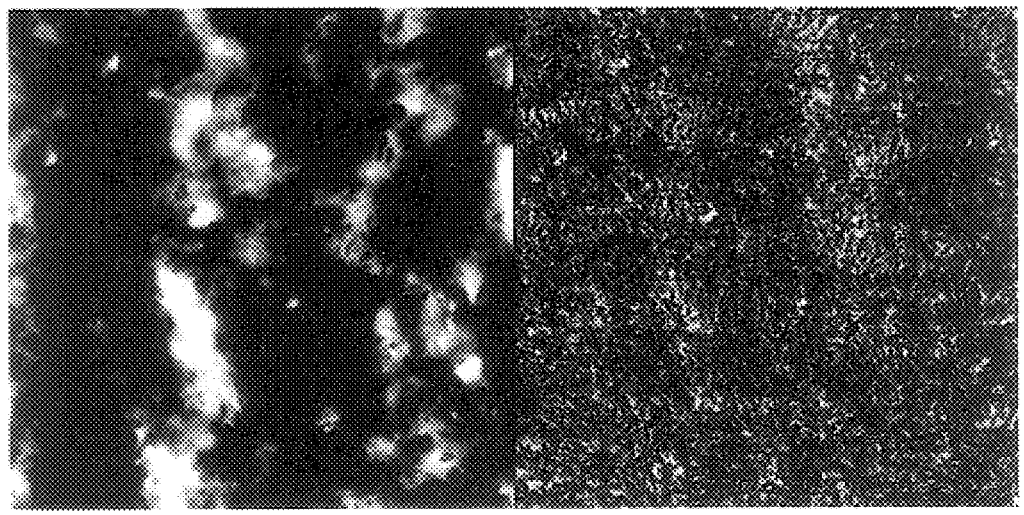
FIG. 10A is a photomicrograph of the AFM height and phase images obtained from triblock (PIB(2.5)-PEG(4.6)-PIB(2.5)) in air.
Figure 10B:
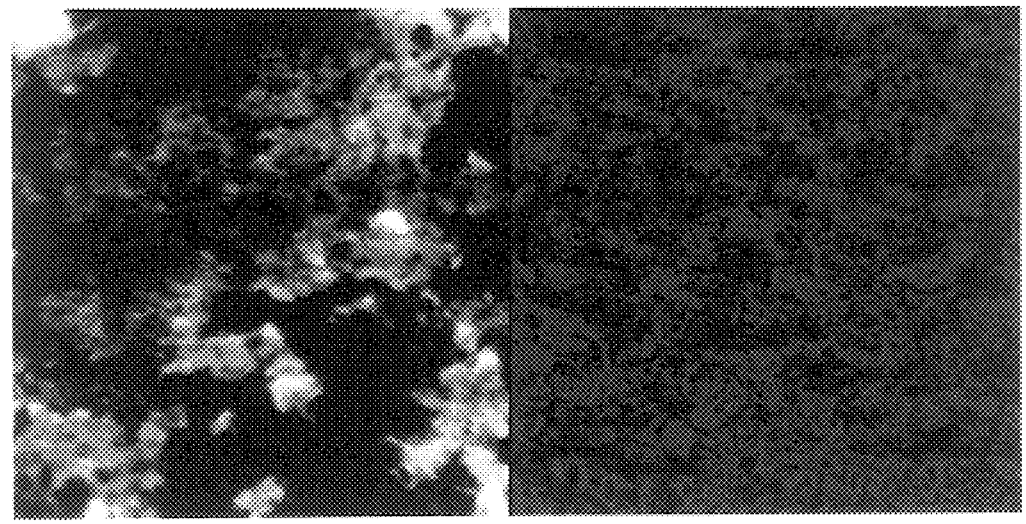
FIG. 10B is a photomicrograph of the AFM height and phase images obtained from triblock (PIB(2.5)-PEG(4.6)-PIB(2.5)) in water.

The surface properties of unswollen and water-swollen block copolymers have been investigated by AFM in tapping mode by phase and height imaging. FIG. 9 shows the images of the triblock copolymer of Example No. 2 of Table I (PIB(9.9)-PEG(6.8)-PIB(9.9)) in contact with water for four hours. The regular pattern of bright and dark areas in the phase image indicates sharp microphase separation. Considering the relatively high PIB content of this material (74.4 weight percent) and its minimal swelling in water ($d_{sw}$=0.13, see Table II), the continuous matrix must be PIB in which are dispersed discrete PEG domains of about 20 nm diameter. The surface is rather smooth with a mean roughness of about 0.34 nm. FIG. 10A shows height and phase images of the triblock copolymer of Example No. 4 of Table I (PIB (2.5)-PEG(4.6)-PIB(2.5)) in air. FIG. 10B shows height and

TABLE II

Swelling of Block Copolymers in Water

| Example | PIB dry wt. % | PIB dry vol. %[a] | PIB wet vol. %[b] | $d_{sw}$ Block Copolymer | $d_{sw}$ PEG Block |
|---|---|---|---|---|---|
| 1 PIB(2.5)-PEG(5) | 33.3 | 40.2 | 5.9 | 6.38 | 9.57 |
| 2 PIB(9.9)-PEG(6.8)-PIB(9.9) | 74.4 | 79.1 | 71.5 | 0.13 | 0.51 |
| 3 PIB(8.2)-PEG(10)-PIB(8.2) | 62.1 | 68.1 | 20.6 | 2.67 | 7.04 |
| 4 PIB(2.5)-PEG(4.6)-PIB(2.5) | 52.1 | 59.4 | 15.4 | 2.8 | 5.84 |
| 5 PIB(2.5)-PEG(2)-PIB(2.5) | 71.4 | 77.1 | 30.1 | 1.66 | 5.8 |
| 6 (-PIB(5.14)-PEG(4.6)-)$_3$ | 52.7 | 59.2 | 14.3 | 3 | 6.34 |
| 7 C(PEG(2.2)-PIB(8.2))$_4$ | 78.8 | 82.9 | 70.4 | 0.21 | 0.63 |
| 8 C(PEG(5)-PIB(2.5))$_4$ | 33.3 | 40.2 | — | Dispersion | — |

[a]calculated with $d_{PIB}$ of 0.89 g/cm and $d_{PEG}$ of 1.2 g/cm, by $(V_{PIB}/V_{dry\ network})$ 100, where V = volume
[b]calculated with $d_{PIB}$ of 0.89 g/cm and $d_{PEG}$ of 1.2 g/cm, by $(V_{PIB}/V_{swollen\ network})$ 100, where V = volume Example Nos. 3–6 of Table II showed swelling in water, and exhibited $d_{sw}$ values in the range of about 3.0 to about 1.66. Example No. 2 (triblock PIB(9.9)-PEG(6.8)-PIB(9.9)) and Example No. 7 (star-block C(PEG(2.2)-PIB(8.2))4) of Table II exhibited low swelling, most likely on account of their relatively high PIB content (74.4 and 78.8 wt.%). The similarity in swelling behavior may reflect similar morphologies in water.

A closer examination of the data shown in Table 11 suggests a PIB content in the range of about 72 to about 74 weight percent provides an amphiphilic copolymer network having optimal swelling properties in water. Below this PIB content the degree of swelling increases and the continuous phase is water-swollen PEG. Block copolymers with less phase images of the triblock copolymer of Example No. 4 of Table I (PIB(2.5)-PEG(4.6)-PIB(2.5)) in contact with water for 1 hour. The images of this material, possibly due to its relatively high PEG content, imbibes water after just one hour of swelling and that the continuous phase is the swollen PEG. Due to the high swelling of PEG segments, the mean surface roughness has increased to about 2.56 run. The image obtained in air shows cocontinuous microphase separated morphology and a mean surface roughness of about 1.12 nm.

In general, a family of novel amphiphilic di-, tri-, multi-, and star-block copolymers comprising of hydrophilic PEG and hydrophobic PIB sequences has been synthesized. One preferred synthetic strategy involves essentially quantitative hydrosilation of allyl-telechelic PEGs with PIB—Si(CH$_3$)H. The microstructures of the various block copolymers have been established by $^1$H and $^{13}$C NMR, and FTIR spectroscopies. Microphase separation of PEG and PIB domains was confirmed by DSC and AFM. Swelling characteristics in water and hexanes were a function of the hydrophilic/hydrophobic ratio (block lengths). Products containing 50–70 weight percent PIB are hydrogels. In water the swollen PEG segments are held together by physical crosslinks formed by hydrophobic forces acting between PIB domains.

The physically crosslinked amphiphilic copolymer networks of the present invention have particular use as biocompatible, hemocompatible and biostable coatings for devices, such as biological implants.

The term "biocompatible", as used throughout this specification, refers to he capability of the physically crosslinked amphiphilic copolymer networks of the resent invention to avoid eliciting a detrimental physiological response from a most individual after implantation, such that an implanted device coated with the network is not rejected by a host individual.

The term "biostability", as used throughout this specification, refers to the capability of the physically crosslinked amphiphilic copolymer networks of the present invention to resist or otherwise withstand the protective physiological responses of a host individual, thus allowing an implant coated with the network to remain implanted and functional in a host individual for a desired period of time.

The term "hemocompatible", as used throughout this specification, refers to the capability of the physically croslinked amphiphilic copolymer networks of the present invention to avoid eliciting a detrimental response from the blood of a host individual.

Based on the foregoing disclosure, it is therefore demonstrated that the objects of the present invention are accomplished by the physically crosslinked copolymer networks and methods of preparation disclosed. The polymer networks of the present invention are particularly well suited as coatings for implantable biological devices. It should be understood that the selection of specific hydrophobic and hydrophilic monomers used to prepare the physically crosslinked polymer network of the present invention can be determined by one having ordinary skill in the art without departing from the spirit of the invention herein disclosed and described. It should therefore be appreciated that the present invention is not limited to the specific embodiments described above, but includes variations, modifications and equivalent embodiments defined by the following claims.

We claim:

1. A physically crosslinked amphiphilic copolymer network comprising a linear block copolymer having hydrophobic polyisobutylene segments and hydrophilic poly(alkylene glycol) segments, wherein the block copolymer has been prepared by hydrosilation, and wherein said polyisobutylene segments are physically crosslinked by hydrophobic forces when said block copolymer is placed in an aqueous media.

2. The copolymer network of claim 1, wherein the poly(alkylene glycol) segments are selected from the group consisting of poly(ethylene glycol), poly(propylene glycol) and poly(butylene glycol).

3. The copolymer network of claim 1, wherein the poly(alkylene glycol) segments are poly(ethylene glycol) segments.

4. The copolymer network of claim 1, wherein the block copolymer is selected from the group consisting of diblock, triblock, multiblock and star block copolymers.

5. The copolymer of claim 4, wherein the block copolymer is a triblock copolymer.

6. A biocompatible coating comprising the copolymer network of claim 1.

7. A hydrogel comprising the copolymer network of claim 1.

8. A geometric shape comprising the copolymer network of claim 1.

9. The geometric shape of claim 8, wherein the shape is selected from a sheet, film, block, bead, tube, capsule, sphere, and cone.

10. A process for preparing a physically crosslinked amphiphilic copolymer network comprising:

providing a linear block copolymer comprising polyisobutylene segments and poly(alkylene glycol) segments, wherein the block copolymer has been prepared by hydrosilation;

introducing the block copolymer into an aqueous solvent; and allowing the block copolymer to self-assemble into a physically crosslinked copolymer network.

11. The process of claim 10, wherein the poly(alkylene glycol) segments are selected from the group consisting of poly(ethylene glycol), poly(propylene glycol) and poly(butylene glycol).

12. The process of claim 11, wherein the poly(alkylene glycol) segments are poly(ethylene glycol) segments.

13. The process of claim 11, wherein the block copolymer is selected from the group consisting of diblock, triblock, multiblock and star block copolymers.

14. The process of claim 13, wherein the block copolymer is a triblock copolymer.

15. A physically crosslinked amphiphilic copolymer network produced by the process of claim 10.

16. A hydrogel produced by the process of claim 10.

17. The method of claim 10, further comprising forming the network into a geometric shape.

18. The method of claim 17, wherein the geometric shape is selected from the group consisting of films, sheets, blocks, beads, tubes, capsules, spheres and cones.

* * * * *